United States Patent [19]

Girault

[11] Patent Number: 4,929,158
[45] Date of Patent: May 29, 1990

[54] TURBOPUMP WITH ACTIVE SUSPENSION FOR A PROPULSION SYSTEM

[75] Inventor: Jean-Philippe Girault, Tourny, France

[73] Assignee: Societe Europeenne de Propulsion, Suresnes, France

[21] Appl. No.: 175,165

[22] Filed: Mar. 30, 1988

[30] Foreign Application Priority Data

Apr. 9, 1987 [FR] France .................... 87 05042

[51] Int. Cl.⁵ .............................. F04B 17/00
[52] U.S. Cl. ................................... 417/405
[58] Field of Search ............... 417/405, 406, 407, 365; 310/90.5

[56] References Cited

U.S. PATENT DOCUMENTS

| | | | |
|---|---|---|---|
| 3,947,153 | 3/1976 | Matthias | 417/365 |
| 3,955,426 | 5/1976 | Klinchuch | 310/90.5 |
| 4,180,946 | 1/1980 | Heijkenskjold et al. | |
| 4,295,803 | 10/1981 | Barthelmess | |
| 4,392,693 | 7/1983 | Habermann et al. | 310/90.5 |
| 4,500,142 | 2/1985 | Brunet | 310/90.5 |
| 4,504,098 | 3/1985 | Battarel et al. | 310/90.5 |
| 4,609,332 | 9/1986 | Miki et al. | 417/365 |
| 4,641,978 | 2/1987 | Kapich | 310/90.5 |
| 4,650,132 | 3/1987 | Graf et al. | 310/90.5 |

FOREIGN PATENT DOCUMENTS

| | | |
|---|---|---|
| 2223218 | 11/1973 | Fed. Rep. of Germany . |
| 3217341 | 3/1983 | Fed. Rep. of Germany . |
| 57-149621 | 9/1982 | Japan . |
| 5773624 | 4/1984 | Japan . |

OTHER PUBLICATIONS

"Compressed Air Magazine", Apr. 1985, —Suspending Rotating Shafts in Midair—pp. 30-33.

Primary Examiner—Louis J. Casaregola
Assistant Examiner—Timothy S. Thorpe
Attorney, Agent, or Firm—Ladas & Parry

[57] ABSTRACT

A turbopump with active magnetic suspension comprises at least two back-up bearings, each constituted by a first ring fast with a rotary shaft and a second ring fast with a casing, the rings being concentric and defining a free space whose length in the radial direction is about half the length of the means air gap of the radial magnetic bearings. The first and second rings are preferably anchored, respectively, in the rotor laminated ferromagnetic armature and in the stator laminated ferromagnetic core of a radial active magnetic bearing which may also provide hydrodynamic effects by pumping fluid into the air gap of the bearing.

13 Claims, 7 Drawing Sheets

TURBOPUMP WITH ACTIVE SUSPENSION FOR A PROPULSION SYSTEM

FIELD OF THE INVENTION

The present invention relates to a turbomachine with active magnetic suspension comprising a fixed casing, a rotary shaft fast with at least one turbine wheel, an axial active magnetic bearing for axial positioning of the rotary shaft inside the casing, axial sensing means for detecting the axial position of the rotary shaft, two radial active magnetic bearings for radial positioning of the rotary shaft inside the casing, at least two radial sensing means for detecting the radial position of the rotary shaft and a control system receiving the signals produced by all the detectors for controlling, via said radial and axial active magnetic bearings, the axial and radial play between the machine components fast with the casing and the machine components fast with the rotary shaft.

BACKGROUND OF THE INVENTION

Rotary machines equipped with an active magnetic suspension are already known, such as for example from U.S. Pat. No. 4,180,946. The suspension of the rotary shaft of a machine by means of active magnetic bearings presents many advantages. It is however necessary to add to the magnetic bearings, auxiliary or back up bearing, generally of ball bearings type, in order to support the rotor in stop position, or in working position in case of failure of the supply to the active magnetic bearings. Said ball bearings, having a metal-with-metal contact, are subject to early wear when they are in service and do not allow a soft landing of the rotor in case of failure of the magnetic bearings. They further contribute to increasing the overall dimensions of the suspension.

It has also been proposed to support a turbo-machine with a radial active central magnetic bearing together with radial fluid end bearings, in order to combine the advantages of fluid bearings with those of magnetic bearings. This type of suspension remains however complex and cumbersome and does not provide all the advantages of the complete active magnetic suspensions with five controlled axes of the type comprising at least one axial magnetic thrust bearing and two radial magnetic bearings with their associated detectors.

SUMMARY OF THE INVENTION

It is the object of the present invention to overcome the aforesaid drawbacks and to propose a turbomachine, and in particular a turbopump, which has all the advantages of the active magnetic suspensions with five controlled axes, together with high working reliability and limited wear, particularly in cases of failure or interruption of the supply of electrical current to the magnetic bearings.

This object is achieved according to the invention with a turbomachine of the type defined hereinabove, which is characterized in that it further comprises at least two auxiliary or back up bearings, each constituted by a first ring fast with the rotary shaft, and by a second ring fast with the casing, concentric with the first ring and defining with said first ring a free space whose length in the radial direction is about half the length of the mean air gap of the radial magnetic bearings, said first and second rings being made of a composite material or in a fluorinated thermoplastic resin.

Advantageously, the first and second rings of an auxiliary bearing are anchored, respectively, in the rotor laminated ferromagnetic armature and in the stator laminated ferromagnetic core of a radial active magnetic bearing.

The first and second rings of a back up bearing can be of a carbon-carbon type or carbon-silicium carbide type or of a silicium carbide-silicium carbide type composite material.

The use of back up bearings of composite material incorporated with the radial magnetic bearings increases the compactness of the machine in avoiding the addition of auxiliary roller bearings, and also ensures a soft landing which, every time, only causes a limited amount of wear to the back up bearings.

According to a first embodiment, each one of the first and second rings of a back up bearing has the shape of a circumferentially continuous ring.

However, according to a second embodiment, each one of the first and second rings of a back up bearing is constituted by a set of spaced apart ring segments.

This last embodiment is particularly advantageous in that it makes it possible, particularly in the case of turbomachines such as turbopumps, to use mixed bearings building up magnetic and hydrodynamic forces, these bearings achieving a redundancy of the magnetic suspension while remaining compact. This increases working safety and guarantees a wideband damping.

Thus, according to one advantageous characteristic of the present invention, the turbopump type turbomachine further comprises channels formed in the stator ferromagnetic cores of the radial active magnetic bearings, the object of which channels is to bring into the air gaps of these bearings, a fluid pressurized by the pump, and the air gaps of the radial magnetic bearings are defined by surfaces whose the geometry varies slightly from one to the other, this in order to create significant hydrodynamic effects at the level of each radial active magnetic bearing.

According to another characteristic of the present invention, the turbine wheels are produced in composite material, such as a material containing carbon-silicium carbide fibers or silicium carbide-silicium carbide fibers.

As to the wheels of the pump, these can also be made of in composite material such as a carbon-resin fibers-based material.

This contributes to reducing the mass of the rotating assembly and, in combination with the suspension means according to the invention, it enables, among other things, the turbine wheels to be placed in overhang fashion.

BRIEF DESCRIPTION OF THE DRAWINGS

The invention will be more readily understood on reading the following description with reference to the accompanying drawings, in which.

DESCRIPTION OF PREFERRED EMBODIMENTS

Figure 1:
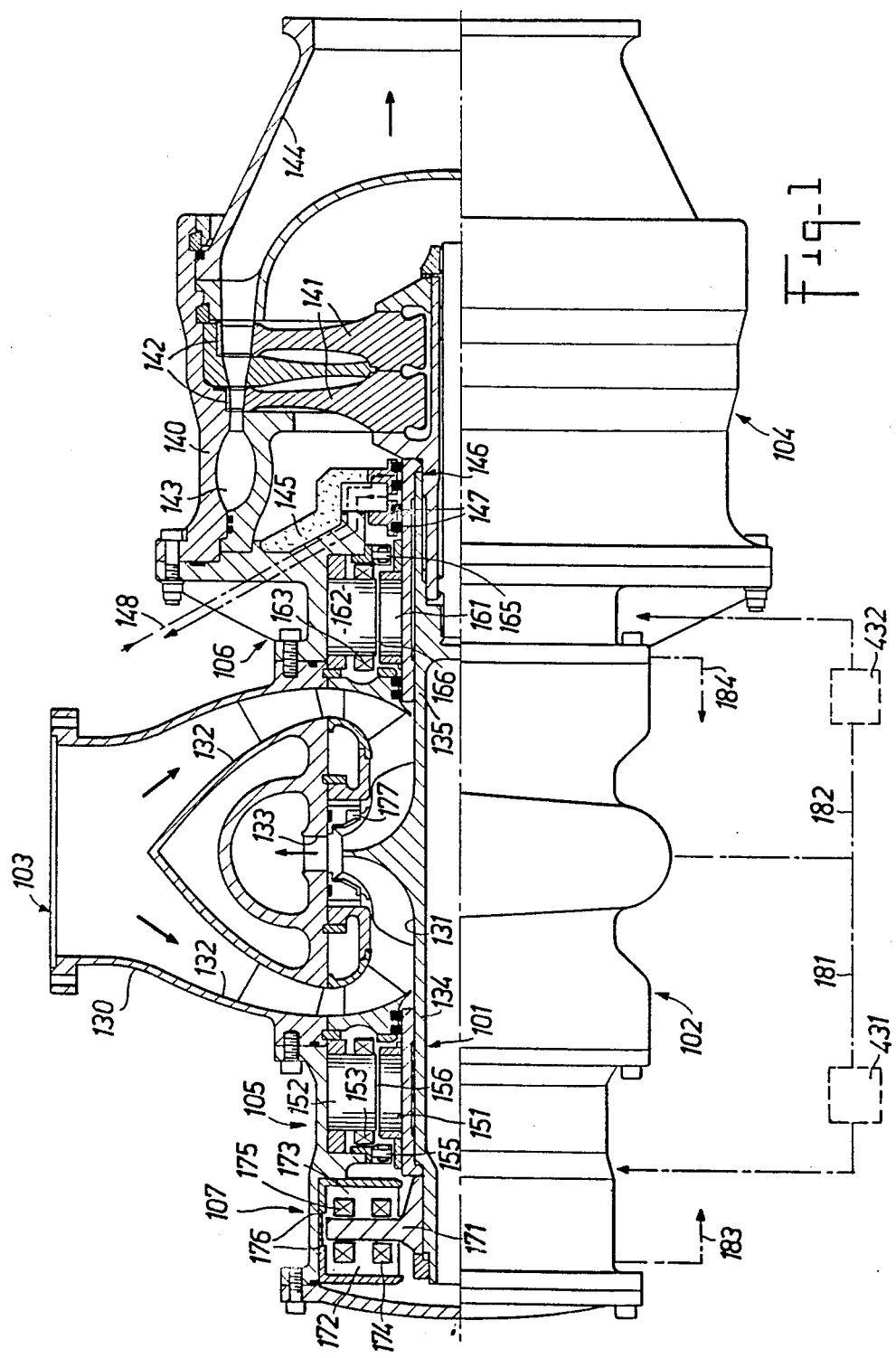
FIG. 1 is a side view showing an axial half-section of a double-input turbopump to which the invention can be applied.
Figure 2:
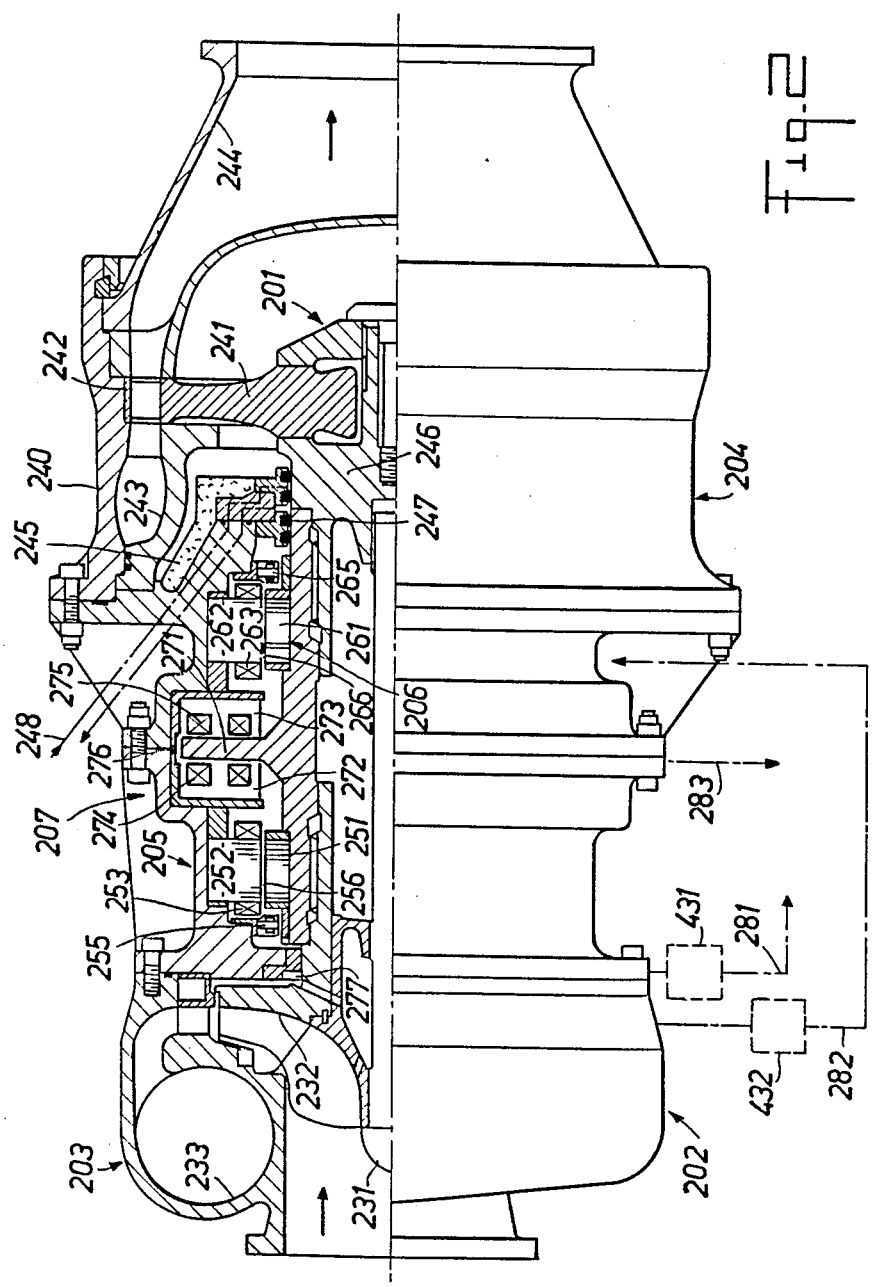
FIG. 2 is a similar view to that of FIG. 1, but relates to a single-input turbopump.
Figure 3:
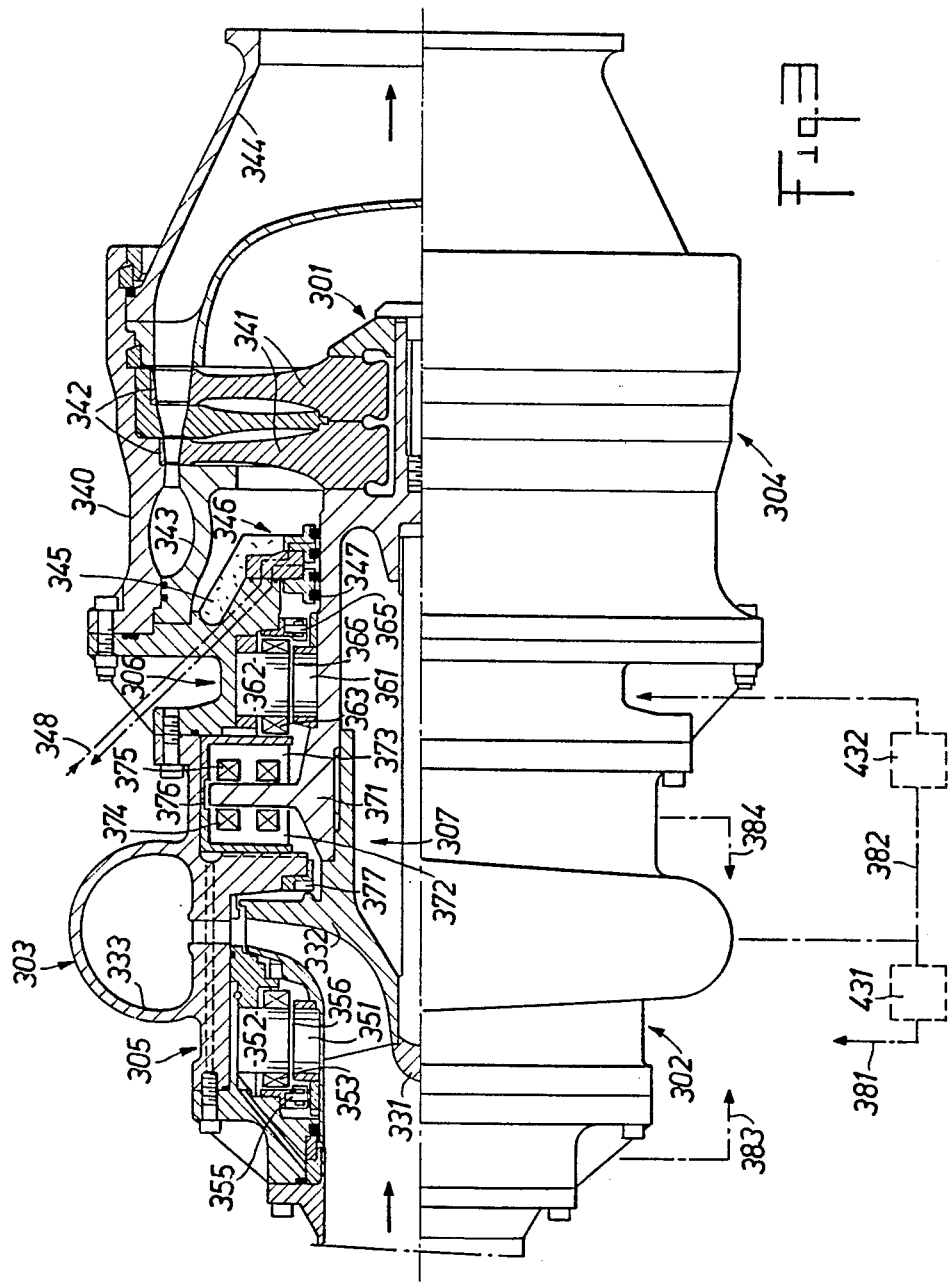
FIG. 3 is a similar view to that shown in FIG. 2, but relates to a single-input turbopump in which one of the radial bearings is localized at the level of the pump bearing-plate.

Reference will be made first to FIGS. 1 to 3 to describe three examples of turbopumps, especially usable in space techniques with a rocket motor, which turbopumps are equipped with an active magnetic suspension and are designed to receive and implement various characteristics of the invention which will be described hereinafter in more detail, with reference to FIGS. 4 to 11.

FIGS. 1 to 3 correspond to three variants of embodiment of a turbopump, each embodiment comprising a series of components, the geometry of which may vary from one embodiment to the other, although the function remains the same. To this effect, similar corresponding components in FIGS. 1 to 3, have been designated by a reference number of which the last two digits are the same, the first digit being a 1, or a 2, or a 3 depending on whether the component belongs to the embodiment of FIG. 1, or of FIG. 2 or of FIG. 3.

FIG. 1 shows a double-input turbopump comprising a casing 102 inside which is mounted a rotary shaft 101. The casing 102 and rotary shaft 101 are equipped with an assembly of members defining a part forming a pump 103, on the left of FIG. 1, and a part forming a turbine 104, on the right of FIG. 1.

Pump 103 is provided with a pumping fluid inlet nozzle 130 defining two inlet circuits 132. The fluid, pumped by wheels 131 fast with the shaft 101 is forced under high pressure by the action of centrifugal force, into outlet conduit 133. The fluid used may be for example a fuel such as liquid hydrogen, hydrocarbons, hydrazine and derivatives, an alcohol, or a comburant such as liquid oxygen or nitrogen derivatives.

Sealing devices of the type with floating rings 134, 135 are placed on either side of the pump 103 between the rotary shaft 101 and the pump members fast with the casing 102.

Turbine 104 comprises on the inside a body 140 fast with the casing 102, a pressurized gas supply chamber 143 and turbine wheels 141 equipped with blades cooperating with abradable tracks 142 formed on the inner wall of the body 140. An opening 144 is provided for the exhaust of the combustion gases out of the turbopump.

Turbine wheels 141 are preferably made from composite materials, such as materials based on carbone-silicium carbide fibers or silicium carbide-silicium carbide fibers. Similarly, the pump wheel or wheels 13 are advantageously made from composite material such as for example materials based on carbon-resin fibers. The use of composite materials makes it possible to reduce the weight and the moment of inertia of the rotary assembly 101, which in turn makes it easier to dynamically control the whole assembly and minimizes the energy required to control the supporting magnetic bearings.

A heat-protecting material 145 is mounted on the casing 102 between the turbine 104, whose wheels are mounted in overhang fashion on shaft 101, and one of the radial bearings 106 supporting the shaft 101, in order to limit the transfer of heat toward the shaft suspension member. A protection device 146 is also provided to achieve dynamic sealing, using floating rings 147 and a sweeping flow 148 of a rare gas such as helium.

As illustrated in FIG. 1, the rotary shaft 101 is mounted inside the housing 102 by way of a magnetic suspension comprising an axial magnetic thrust bearing 107 situated on the end of the shaft opposite the turbine 104, and at least two radial magnetic bearings 105, 106 situated on either side of the pump 103.

Magnetic thrust bearing 107 comprises a disk shaped ferromagnetic armature 171 fast with shaft 101 and perpendicular thereto, and fixed ferromagnetic cores 172, 173 which are fast with the casing 102 and placed on either side of armature 171, forming with the latter axial air gaps 176. Electromagnet windings 174, 175 are conventionally placed in notches provided in cores 172, 173 and are connected to a control circuit 400 (FIG. 11) receiving signals from at least one axial detector 177 of the axial position of the rotor 101 in order to constitute an active axial thrust bearing. As illustrated in FIG. 1, detector 177, which constitutes both an axial and a radial detector, is situated at the level of pump 103, but could also be situated elsewhere along shaft 101.

Radial magnetic bearings 105, 106 comprise a ring-shaped rotor laminated ferromagnetic armature 151, 161 which is fixed on rotary shaft 101, a stator laminated ferromagnetic core 152, 162 which is fast with casing 102, and electromagnetic windings 153,163 which are controlled by control circuits 400 (FIG. 11) receiving signals from at least two radial detectors 155, 165 of the radial position of shaft 101.

Detectors 155, 165 can be placed immediately next to the radial bearings 105, 106 as illustrated in FIG. 1, although additional radial detectors can be placed elsewhere along shaft 101, such as for example, at the level of the pump joints 134, 135 or of the turbine joints 146, or else in other special useful points as a function of the dynamic characteristics of the shaft. In the case illustrated in FIG. 1, the detector 177 constitutes an additional radial detector provided at the level of pump 103. This enables the use of a system 400 for controlling the active magnetic suspension which takes into account the signals lrom all the detectors and which can control all axial and radial play with the object of reaching the desired specifications, both from the standpoint of the stability of shaft 101 and from the standpoint of the output of the rotary components.

Radial magnetic bearings 105, 106 are equipped with rings in composite materials acting as auxiliary rings, as described hereinafter with reference to FIGS. 4 and 5. But for more clarity, these rings have not been shown in FIG. 1. It is however worth noting that the fact of using auxiliary damping means incorporated in radial bearings avoids the need for auxiliary roller bearings while ensuring that the surfaces of the rotor armatures 151,161 and of the stator cores 152,162 defining the air gaps 156,166 of radial bearings 105, 106 keep their integrity regardless of the working conditions.

As described hereinafter in more detail with reference to FIGS. 6 to 10, radial bearings 105, 106 are of mixed type and comprise channels formed in the stator armatures 152, 162 in order to introduce in air gaps 156, 166 of the radial bearings, part of the pressurized fluid conveyed by pump 103, so as to create hydrodynamic effects in the air gaps 156,166 and to obtain a wideband damping as well as a redundancy of suspension by the combination of magnetic and hydrodynamic effects.

FIG. 1 illustrates symbolically the lines 181, 182 feeding high pressure fluid to air gaps 156, 166, and lines 183, 184 feeding back the low pressure fluid. Pressure reducing valves 431, 432 can be interposed in feeding lines 181, 182 in order to regulate the pressure of the fluid fed to air gaps 156, 166. Pressure reducing valves 431, 432 can be controlled by a centralized control system associated with circuits 400 controlling the magnetic suspension.

The turbopump according to FIG. 2 only differs from that according to FIG. 1 by the disposition of certain components. For example, pump 203 has a single inlet 232 and not a double one, turbine 204 is single-staged instead of double-staged, and axial thrust bearing 207 is situated between radial bearings 205 and 206 and not on the end of rotary shaft 201. The various components illustrated in FIG. 2 have the same function as those described with reference to FIG. 1 which contain in their reference number, the same last two digits. For this reason, said components will not be described again.

The turbopump illustrated in FIG. 3 is a variant of the turbopump of FIG. 2. According to FIG. 3, the radial magnetic bearing 305 is placed on the shroud of pump 303, i.e. on the side of pump 303 opposite axial thrust bearing 307 and turbine 304, and not between pump 203 and axial thrust bearing 207 as illustrated in the embodiment of FIG. 2. Nevertheless, the magnetic suspension of the turbopump according to FIG. 3 works in the same way as the suspension of the turbopumps according to FIGS. 1 and 2, and for the description of the various components of FIG. 3, reference will be made to the description, given with reference to FIG. 1, of the components with reference numbers containing the same last two digits.

Figure 4:
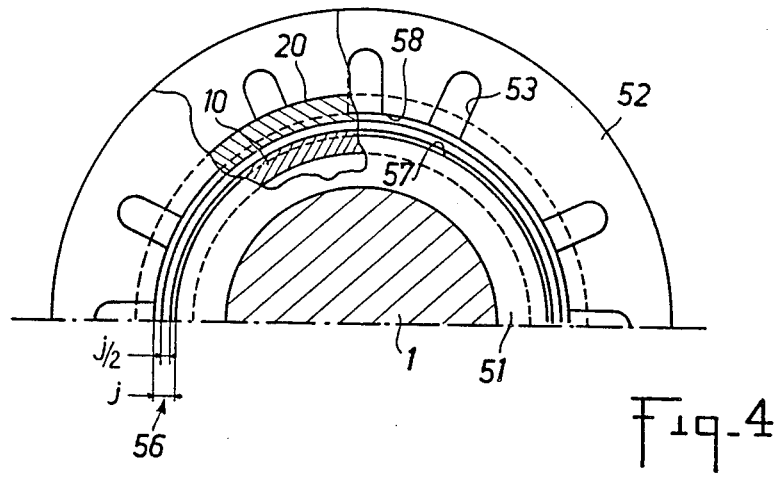
FIG. 4 is a half-section view, on a radial plane, of a radial magnetic bearing, according to a first embodiment of the invention.

Reference should now be made to FIG. 4 to describe a radial magnetic bearing equipped with auxiliary or back up bearings incorporated in said radial magnetic bearing.

In the bearing illustrated in FIG. 4, the rotor armature 51 is constituted of an assembly of ferromagnetic laminations mounted on the rotary shaft 1, whereas the stator core 52 comprises a stack of ferromagnetic laminations provided with notches 53 designed to receive windings, which have not been shown in the drawing for clarity purposes. An air gap 56, the length of which in the radial direction is equal to a mean value j, for example about a few tenths of a millimeter, is provided between the surfaces 57 and 58 of the rotor armature and stator core, 51 and 52 respectively, situated in facing relationship.

Concentric rings 10, 20 are anchored in the rotor armature 51 and in the stator core 52 in such a way as to provide between them a free space, whose length in the radial direction is about half j/2 of the mean length j of the air gap 56 of the magnetic bearing.

Rings 10, 20 are made of a fluorinated thermoplastic resin such as PTFE, or of a composite material, such as for example of carbon-carbon type, or of carbon-silicium carbide type. Thus, the rings 10, 20 do not interfere with the magnetic field inside air gap 56, but during stoppage of the machine, or in case of an interruption in the supply of the electromagnets of the radial bearing, they then ensure a soft landing by bringing rings 10, 20 in mutual contact, this preserving the integrity of the metallic surfaces 57, 58 of armatures 51 and cores 52 of the magnetic bearing.

Figure 5:
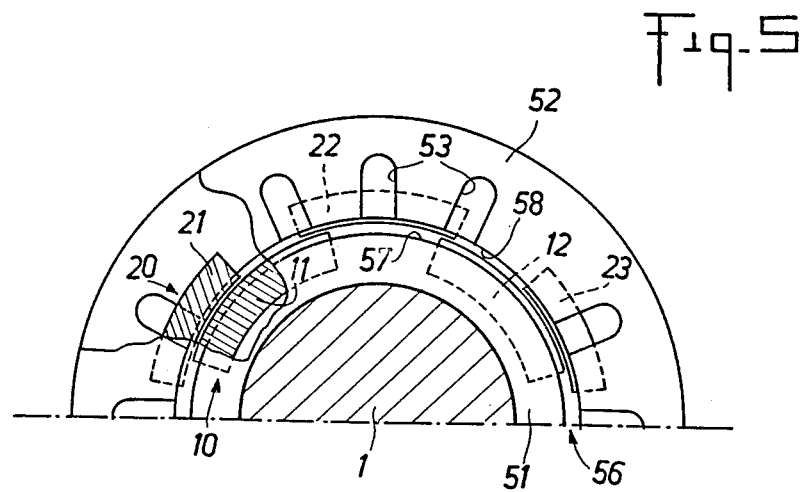
FIG. 5 is a half-section view, on a radial plane, of a radial magnetic bearing according to a second embodiment of the invention.

FIG. 5 illustrates a second embodiment of the auxiliary or back up bearings, in which the rings 10, 20 are not complete as they are in the case of FIG. 4, but are each constituted by a set of respectively spaced apart ring segments 11, 12; 21, 22, 23.

Preferably, ring segments 11, 12 or 21, 22, 23 of one of the rings 10 or 20 extend circumferentially according to an arc of a circle of length greater than about twice the length of the free spaces provided between ring segments 21, 22, 23 or 11, 12 of the other ring 20 or 10.

The ring segments have the same function as complete rings except that they allow larger free spaces to be created between the rotor 51 equipped with ring 10 and the stator 52 equipped with ring 20, thereby permitting a fluid flow creating hydrodynamic effects whenever the magnetic bearing is used as a mixed bearing.

As indicated herein above, radial magnetic bearings such as 105, 106, 205, 206, 305, 306 in FIGS. 1 to 3, are advantageously hybrid bearings. In such a case, channels are formed in the stator cores in order to bring the fluid pressurized by pump 103, 203, 303 in the air gaps of the radial bearings. Moreover, the surfaces (referenced 57 and 58 in FIGS. 4 to 10) of the rotor armature and of the stator core (referenced 51 and 52 in FIGS. 4 to 10) in each radial bearing, have very different geometrical shapes in order to create significant hydrodynamic effects at the level of each radial bearing.

FIGS. 6 to 10 illustrate by way of example, several possible geometrical shapes for surfaces 57 and 58, hence several shapes for air gap 56 combined with controlled off-centerings of the rotor. For clarity purposes, the segments of rings 10, 20 of the damping device of FIG. 5 have not been shown in FIGS. 6 to 10.

Figure 6:
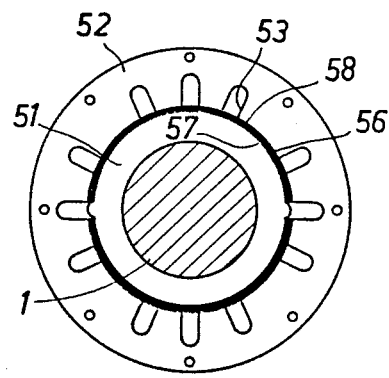
FIGS. 6 to 10 are radial cross-sectional views showing various shapes for the air gap in a mixed radial bearing with magnetic and hydrodynamic effects according to the invention.

FIG. 6 illustrates a circular shape of the air gap 56 with two pockets.

Figure 7:
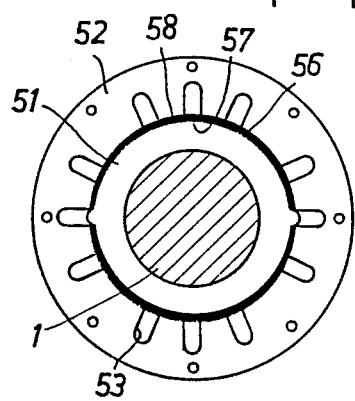
Figure 8:
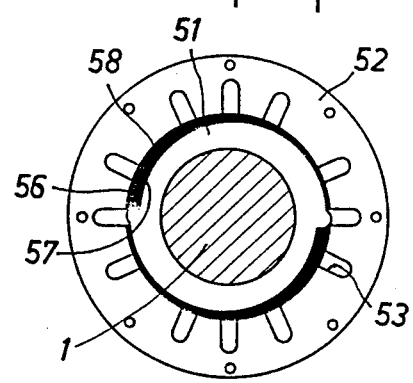
Figure 9:
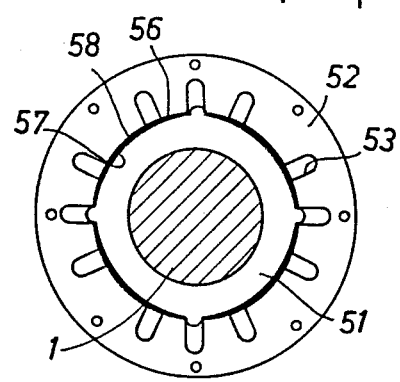
Figure 10:
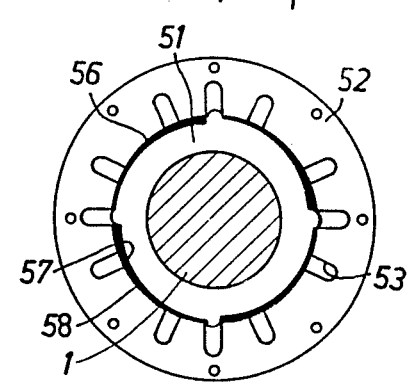

FIGS. 7 and 8 show geometrical shapes of air gap 56 with two lobes, respectively symmetrical and asymmetrical.

In the case of mixed type radial bearings, the stator electromagnet windings and the rotor and stator ferromagnetic armatures or cores are coated with a tight insulating material for protection against chemical attacks from the fluids conveyed by the pump and introduced in the air gaps.

The use of mixed bearings which become active as soon as the pump reaches the satisfactory overpressure, provides a wideband damping while contributing to the suspension of the rotary shaft by the addition of magnetic and hydrodynamic effects.

Figure 12:
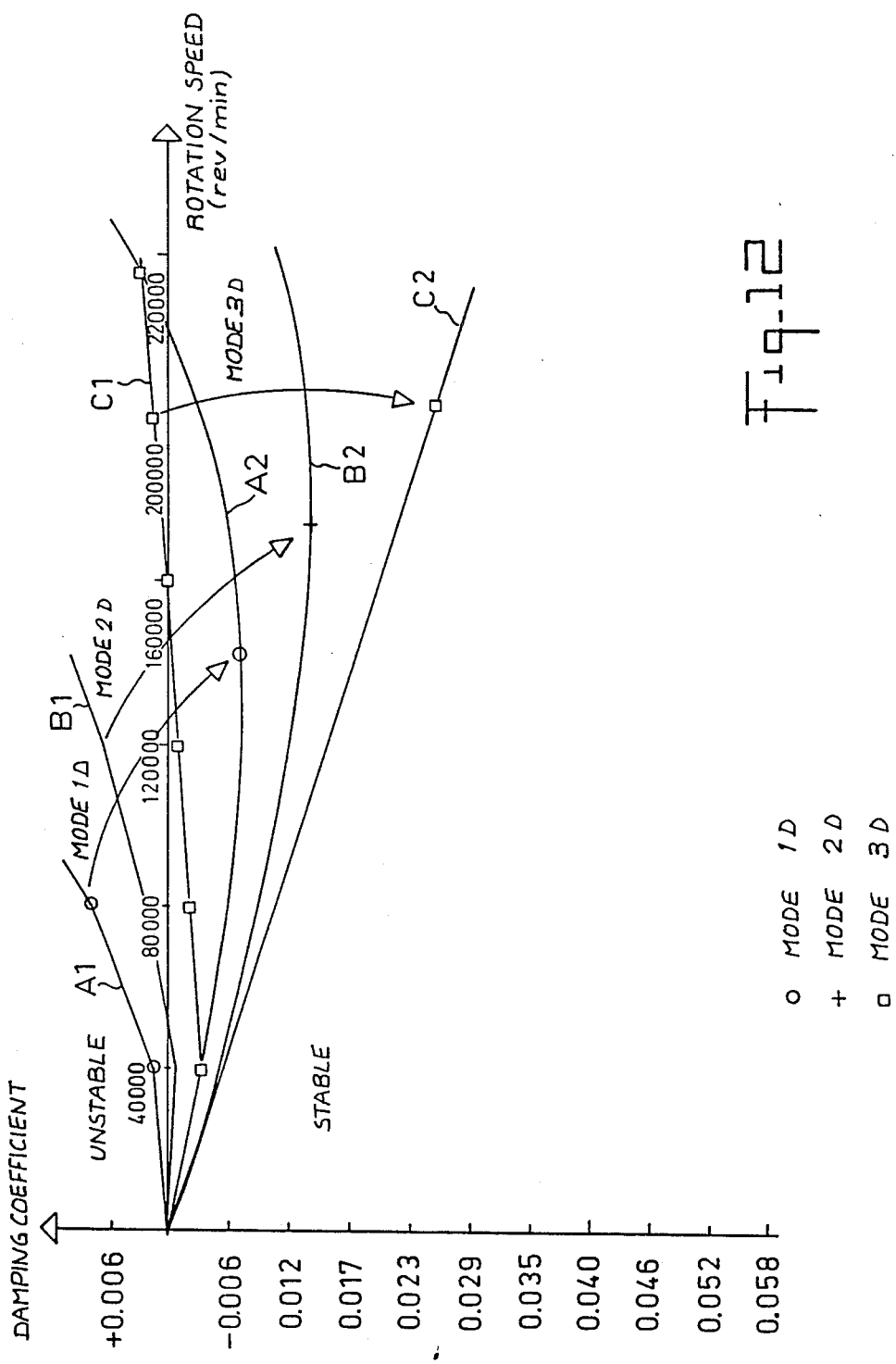
FIG. 12 shows, for different methods of control of the magnetic suspension according to the invention, curves of suspension damping coefficient as a function of the shaft rotating speed, on the one hand, for magnetic bearings without hydrodynamic effect, and on the other hand, for mixed radial magnetic bearings causing a hydrodynamic damping.

FIG. 12 shows curves illustrating the effect of the hydrodynamic damping on the stability of three direct mofes for the servocontrol of the bearings.

Curves A1, B1, C1 represent the damping coefficient of the active magnetic suspension as a function of the speed of rotation of the rotary shaft for damping actions according to direct modes 1, 2, 3 respectively, such as applied by processing circuits 411, 412, 413 respectively in control circuits 400 (FIG. 11), for radial magnetic bearings of conventional type.

Curves A2, B2, C2 represent the damping coefficient of the suspension as a function of the speed of rotation of the rotary shaft in the same conditions as for curves A1, B1, C1 but using mixed type radial bearings. It is found there that stability has been greatly increased.

The adjustable and reprogrammable system for controlling the active magnetic suspension can be produced in interchangeable wired logic, but is advantageously of digital type. In this case the control circuit comprises a processing sequence constituted of an analog-to-digital converter receiving the signals from the different detectors 55, 65, 77 (FIG. 11), of a computer programmed for working out in real time a response adapted to specific working conditions of the turbomachine, or to external perturbations, and of a digital-to-analog converter controlling the power amplifiers 420, 421, 422 which control the active magnetic bearings.

Figure 11:
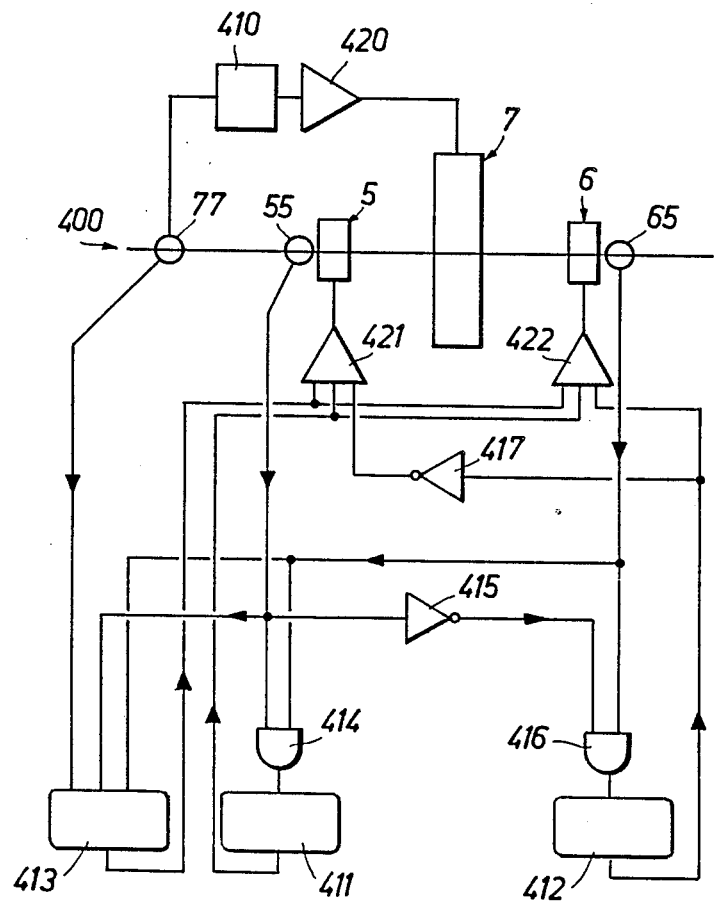
FIG. 11 diagrammatically illustrates one example of a control system for controlling the magnetic bearings of an active magnetic suspension applicable to the present invention.

FIG. 11 diagrammatically illustrates a circuit 100 controlling an axial thrust bearing 7 and two radial detectors 5, 6 of a turbopump suspension, from two radial detectors 55, 65 situated close to radial bearings 5, 8 respectively, and from a detector 77 situated at the level of the pump and giving nformation on both the axial and radial positions of the rotary shaft.

The signals issued from detector 77 are applied, on the one hand, to a processing module 410 used for controlling amplifier 420 supplying the windings of the axial thrust bearing 7, and on the second hand, to a processing module 413, controlling radial bearings 5, 6 according to a direct mode 3. Processing module 413 also receives the signals produced by radial detectors 55, 65 and is used for controlling, according to mode 3, the power amplifiers 421, 422 associated to radial bearings 5, 6.

A processing module 411 receives via an adder circuit 414, the signal produced by radial detectors 55, 65 and is used for controlling, according to direct mode 1, the power amplifiers 421, 422.

A processing module 412 receives via an adder 416, on the one hand, the signals produced by radial detector 65 situated next to radial bearing 6, and on the other hand, after passage through an inverter 415, the signals produced by radial detector 55 situated next to radial bearing 5. The signals issued from the processing module 412 are used for directly controlling, according to mode 2, the power amplifier 422 associated to radial bearing 6 and, via an inverter 417, the power amplifier 421 associated to radial bearing 5.

Obviously the control circuits 400 diagrammatically illustrated in FIG. 11 are but one example of several possible modes of controlling the active magnetic suspension, and other variants are possible.

What is claimed is:

1. Turbopump with active suspension for a propulsive system comprising a fixed casing, a rotary shaft fast with at least one turbine wheel, an axial active inside the casing, axial sensing means including detectors for detecting the axial position of the rotary shaft, two radial active magnetic bearings for the radial positioning of the rotary shaft inside the casing, at least two radial sensing means including detectors for detecting the radial position of the rotary shaft, and a control system receiving signals delivered by all the detectors in order to control, via said radial and axial active magnetic bearings, axial and radial play between the components of the machine fast with the casing and the components of the machine fast with the rotary shaft, wherein said turbopump further comprises at least two back-up bearings, each constituted by a first ring fast with the rotary shaft, and a second ring fast with the casing, said second ring being concentric with the first ring and defining with said first ring a free space the length of which in the radial direction is about one half the length of the mean air gap of the radial magnetic bearings, said first and second rings being made of a composite material or a fluorinated thermoplastic resin, said turbopump further comprising channels formed in the stator ferromagnetic cores of the radial active magnetic bearings so as to bring a fluid pressurized by the pump into the air gaps of said bearings, said air gaps of the radial magnetic bearings being defined by surfaces of geometrical shape varying slightly from one to the other in order to create significant hydrodynamic effects at the level of each of the radial active magnetic bearings.

2. Turbopump as claimed in claim 1, wherein the first and second rings of one back-up bearing are anchored, respectively, in the rotor laminated ferromagnetic armature and in the stator laminated ferromagnetic core of a radial active magnetic bearing.

3. Turbopump as claimed in claim 1, wherein said first and second rings of one back-up bearing are made of a carbon-carbon type or carbon-silicium carbide type or silicium carbide-silicium carbide type composite material.

4. Turbopump as claimed in claim 1 wherein each one of the first and second rings of an back-up bearing has the shape of a circumferentially continuous ring.

5. Turbopump as claimed in claim 1, wherein each of the first and second rings of one back-up bearing is constituted by a set of spaced apart ring segments.

6. Turbopump as claimed in claim 5, wherein the ring segments of one of the first and second rings extend circumferentially along an arc of circle whose length is more than about half the length of the free spaces provided between the ring segments of the other ring.

7. Turbopump as claimed in claim 5, wherein the windings and the rotor and stator ferromagnetic armatures of the radial magnetic bearings are coated with a tight insulating material for protection against chemical attacks from the fluids conveyed by the pump and into the air gaps.

8. Turbopump as claimed in claim 5, wherein said machine further comprises reducing valves which provide the pressure required for feeding the fluid to the air gaps of the radial magnetic bearings, to the fluid pressurized by the pump, said reducing valves being controlled by a control circuit associated with the circuit controlling the active magnetic suspension.

9. Turbopump as claimed in claim 1, wherein the control system controlling the active magnetic suspension comprises a processing sequence unit comprising of an analog-to-digital converter receiving the signals from the different detectors, a computer programmed for working out in real time a response adapted to specific working conditions of the turbomachine, or to external perturbations, and a digital-to-analog converter controlling power amplifiers controlling the active magnetic bearings.

10. Turbopump as claimed in claim 1, wherein the radial or axial detectors are mounted at the joints of a turbine or a pump.

11. Turbopump as claimed in claim 1, wherein the turbine wheels are made of composite material based on carbon-silicium carbide fibers or on silicium carbide-silicium carbide fibers.

12. Turbopump as claimed in claim 1 wherein wheels of the pump are made from a composite material based on carbon-resin fibers.

13. Turbopump as claimed in claim 1, of the turbopump wherein one of the radial magnetic bearings is mounted on a pump shroud.

* * * * *